United States Patent
He et al.

(10) Patent No.: US 10,891,501 B2
(45) Date of Patent: Jan. 12, 2021

(54) AUTOMATICALLY ASSOCIATING ROAD SIGN INFORMATION WITH ROAD SEGMENTS USING IMAGE DATA

(71) Applicant: Uber Technologies, Inc., San Francisco, CA (US)

(72) Inventors: Lin He, San Mateo, CA (US); Nishanth Mohan, Cupertino, CA (US)

(73) Assignee: Uber Technologies, Inc., San Francisco, CA (US)

( * ) Notice: Subject to any disclaimer, the term of this patent is extended or adjusted under 35 U.S.C. 154(b) by 45 days.

(21) Appl. No.: 16/267,697

(22) Filed: Feb. 5, 2019

(65) Prior Publication Data

US 2020/0242377 A1 Jul. 30, 2020

Related U.S. Application Data (60) Provisional application No. 62/797,779, filed on Jan. 28, 2019.

(51) Int. Cl.
*G06K 9/00* (2006.01)
(52) U.S. Cl.
CPC ................ *G06K 9/00818* (2013.01)
(58) Field of Classification Search
CPC .... G06N 20/00; G06N 7/005; G06K 2209/01; G06K 9/3208
See application file for complete search history.

(56) References Cited

U.S. PATENT DOCUMENTS

| | | | | |
|---|---|---|---|---|
| 8,755,572 B1* | 6/2014 | Arfvidsson | ........ | G01C 21/3673 382/113 |
| 2008/0075367 A1* | 3/2008 | Winn | ............... | G06K 9/342 382/180 |
| 2010/0067805 A1* | 3/2010 | Klefenz | ............. | G06K 9/00818 382/201 |
| 2011/0141242 A1* | 6/2011 | Fernandez Alvarez | | G08G 1/09623 348/47 |
| 2011/0249867 A1* | 10/2011 | Haas | ................. | G06K 9/6257 382/103 |
| 2012/0162429 A1* | 6/2012 | Wuerz-Wessel | | G06K 9/00818 348/148 |
| 2015/0220795 A1* | 8/2015 | Fischer | ............... | B60R 1/00 348/148 |
| 2015/0345974 A1* | 12/2015 | Takahashi | ............. | B60W 50/14 701/461 |

(Continued)

*Primary Examiner* — Jingge Wu
(74) *Attorney, Agent, or Firm* — Fenwick & West LLP (57) ABSTRACT

A transport service system automatically associates road sign information with road segments based on image data including a representation of the road sign. The transport service system receives image data from one or more camera systems. Based on the image data, the transport service system determines a distance score and an orientation score for one or more candidate road segments. The transport service system additionally determines whether the image data is anomalous. Based on the determined distance and orientation scores, the transport service system generates a composite score and a confidence score for each candidate road segment. The confidence score is adjusted based on whether the image data is anomalous. Based on the generated scores, the transport service system identifies a most likely candidate road segment for association with the road sign.

20 Claims, 6 Drawing Sheets

(56) References Cited

U.S. PATENT DOCUMENTS

| | | |
|---|---|---|
| 2017/0166122 A1* | 6/2017 | Ando ................. B60Q 9/00 |
| 2017/0193312 A1* | 7/2017 | Ai ...................... G06F 13/20 |
| 2017/0221381 A1* | 8/2017 | Tamir ............. G08G 1/096741 |
| 2018/0188060 A1* | 7/2018 | Wheeler ............. G06T 17/05 |
| 2019/0303693 A1* | 10/2019 | Watanabe ........ G08G 1/096716 |

* cited by examiner

AUTOMATICALLY ASSOCIATING ROAD SIGN INFORMATION WITH ROAD SEGMENTS USING IMAGE DATA

CROSS-REFERENCE TO RELATED APPLICATIONS

This application claims benefit of U.S. Provisional Patent Application No. 62/797,779 filed on Jan. 28, 2019, which is incorporated by reference in its entirety.

BACKGROUND

This disclosure relates generally to associating road signs with road segments, and more specifically to automatically associating road sign information with road segments based on image data.

A transport service system stores and maintains data describing road segments, traffic laws, traffic data, and other information for use during transport services. For example, the transport service system uses data to determine an optimal route during a transport service trip, or to identify a most likely path taken by a vehicle on a past trip. Road signs are beneficial in determining information describing road segments, and may include speed limit signs, stop signs, warning signs, and the like. For road sign information to be used correctly by the transport service system, the information that the road sign is conveying (e.g., speed limits, lane information, upcoming junctions, warnings, etc.) and the road segment that the information corresponds to must be identified.

However, identifying road signs and associating them correctly with a corresponding road segment may be costly in terms of money, time, and labor, or prone to error. Camera systems and other equipment used to gather data describing road signs is often expensive. Human supervision or labor is often required to enter road sign data and ensure that incorrect data is not stored or used by the transport service system.

SUMMARY

According to described embodiments, a transport service system automatically associates road sign information with road segments using image data including the road sign obtained from one or more camera systems. The image data contains metadata describing the location of the camera at the time of image capture, the direction of the camera at the time of image capture, and the like. Using the image data and the associated metadata, the transport service system applies an algorithm to score candidate road segments, the score representing a likelihood of the candidate road segment corresponding to the road sign. Based on the score, road sign information may be automatically associated with road segments or may be flagged for review, reducing the required amount of human supervision.

The transport service system identifies a composite score based on a distance score and an orientation score for a given candidate road segment and road sign. A distance score is determined from a distance between a road sign and a candidate road segment, where a higher score indicates that a road sign and a candidate road segment are closer and accordingly are more likely to be associated. An orientation score is determined from the angle of a road sign relative to a candidate road segment, where a higher score indicates that a road sign is oriented such that it directly faces oncoming traffic for a candidate road segment and accordingly is more likely to be associated with the candidate road segment. The distance score and orientation score are combined to generate a composite score.

In one embodiment, the composite score may be used to determine a confidence score. The confidence score represents the system's confidence in the association between a candidate road segment and a road sign, and may be adjusted according to anomaly detection algorithms. The transport service system determines whether image data for the road sign is anomalous. In the case that an anomaly is detected, the confidence score is adjusted lower. This ensures road signs with anomalous data are more likely to have a lower confidence score, and are accordingly more likely to be flagged for review in a downstream review process.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

(a) System Architecture

Figure 1:
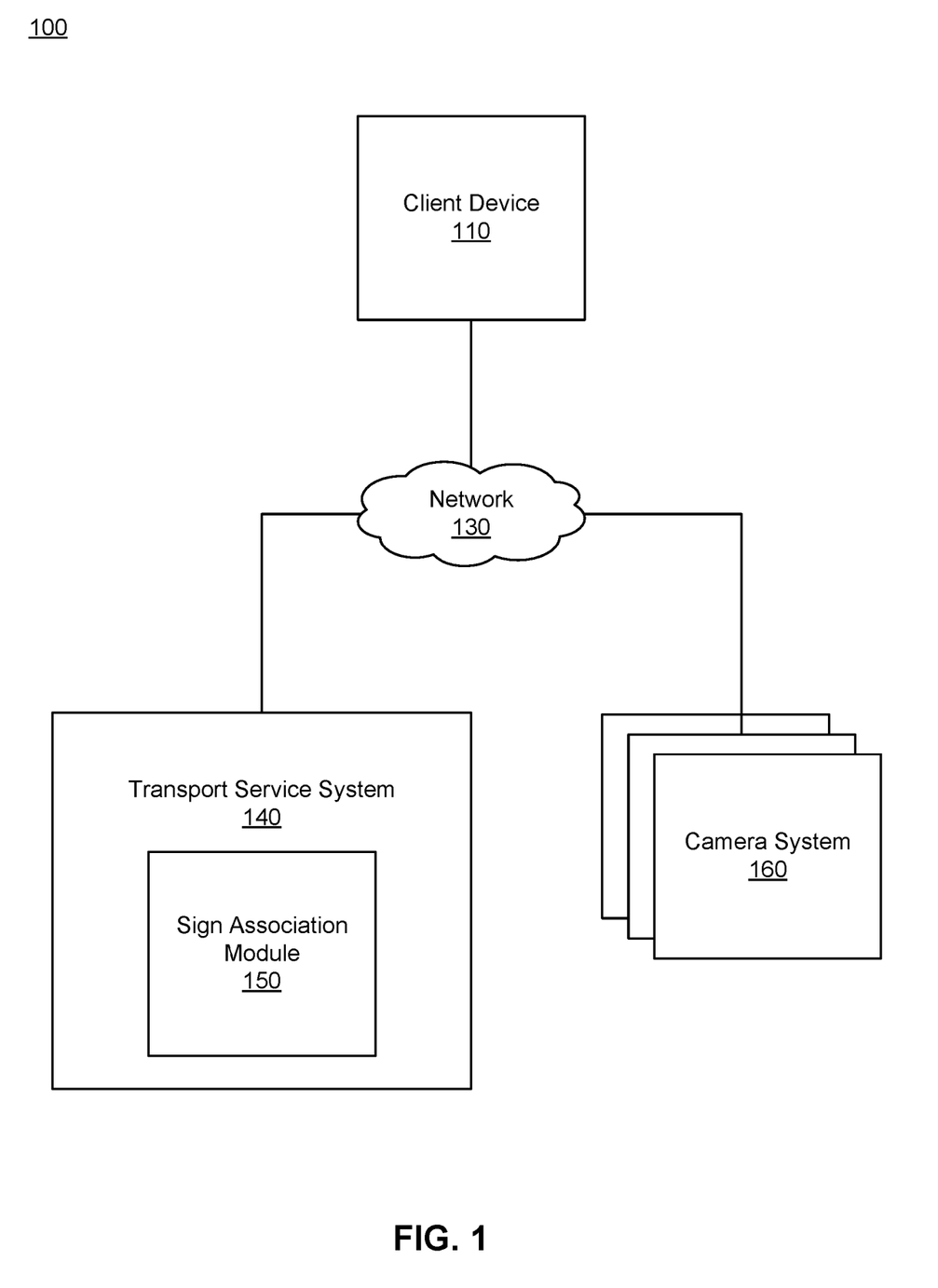
FIG. 1 is a block diagram of a system environment for a transport service system including a sign association module, in accordance with an embodiment.

FIG. 1 is a block diagram of a system environment for a transport service system 140, in accordance with some embodiments. FIG. 1 includes a client device 110, a network 130, the transport service system 140, and one or more camera systems 160. The transport service system 140 includes a sign association module 150. For clarity, only one client device 110 is shown in FIG. 1. Alternate embodiments of the system environment can have any number of client devices 110 as well as multiple transport service systems 140 and multiple camera systems 160. The functions performed by the various entities of FIG. 1 may vary in different embodiments. The transport service system 140 may provide routing, direction, and timing information to the client device 110. The transport service system 140 stores and maintains map data including information about road segments and other map features for use in providing routing, direction, and timing information.

Users may interact with the transport service system 140 through client devices 110. Client devices 110 can be personal or mobile computing devices, such as smartphones, tablets, or notebook computers. Client devices 110 may interact with the transport service system 140 through client applications configured to interact with the transport service system 140. Users and drivers may interact with the client applications of the client devices 110 to request and access information about rides arranged via the transport service system 140. The client applications can present information received from the transport service system 140 on a user interface, such as a map of the geographic region, the estimated trip duration, and other information. Additionally, the client devices 110 may provide their location and other data to the transport service system 140. For example, a current location of a client device 110 may be designated by a user or driver or detected using a location sensor of the client device (e.g., a global positioning system (GPS) receiver) and provided to the transport service system 140 as coordinates.

The client devices 110 can communicate with the transport service system 140 via the network 130, which may comprise any combination of local area and wide area networks employing wired or wireless communication links. In some embodiments, all or some of the communication on the network 130 may be encrypted.

One or more camera systems 160 may interact with the transport service system 140 via the network 130. A camera system 160 may comprise multiple cameras or other devices capable of capturing, storing, and transmitting image data. In one embodiment, the camera system 160 is mounted on a vehicle of the transport service system 140. The camera system 160 captures image data and associates metadata with the image data. For example, the metadata includes a direction of the camera at the time of image capture, a location of the camera at the time of image capture, and other metadata describing the captured image data. The camera system 160 communicates with the transport service system 140 to provide the captured image data and associated metadata to the transport service system for use in the sign association module 150.

Figure 3:
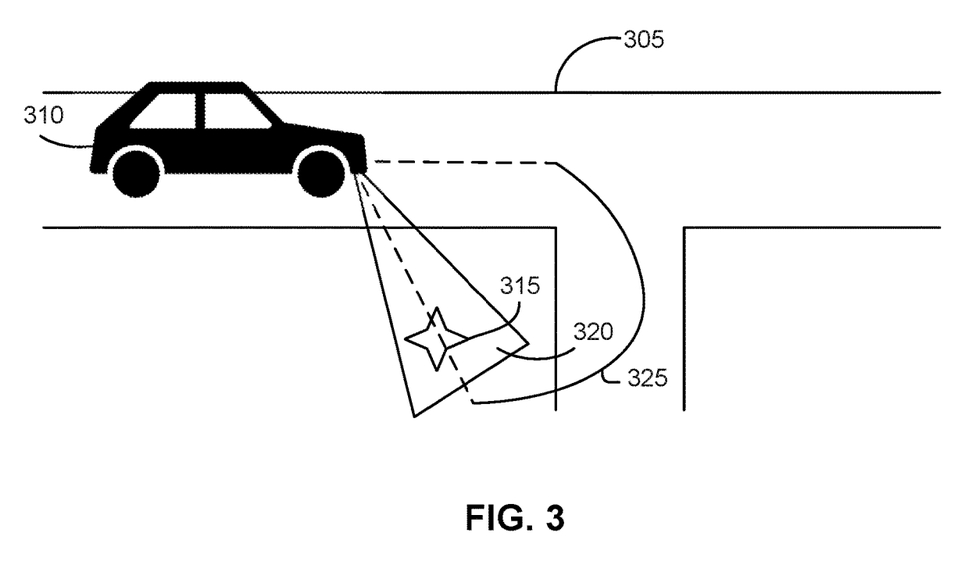
FIG. 3 is an example illustrating a camera system mounted on a vehicle capturing image data including a representation of a road sign, in accordance with an embodiment.

FIG. 3 is an example illustrating a camera system 160 mounted on a vehicle capturing image data including a representation of a road sign, in accordance with some embodiments. A vehicle 310 carries a camera system 160 capable of capturing image data, associating the captured image data with metadata describing the location of the image capture and the orientation of the camera at image capture, and providing the captured image data to a transport service system 140. In the example shown in FIG. 3, the vehicle 310 traverses a road segment 305 associated with a road sign 315. The vehicle 310 uses a camera system 160 to capture image data including the road sign 315. Image data including a representation of a road sign is associated with a viewing triangle 320 of a camera in the camera system 160 including the road sign 315 at the time of capture. The image data is additionally associated with metadata including location data and orientation data of the camera system 160 at the time of image capture. For example, the metadata includes a latitude and longitude of the camera system 160 at the time of image capture. In an embodiment, the latitude and longitude data of the camera system 160 corresponds to GPS or other navigation data of the vehicle 310 at the time of image capture. In another example, the metadata includes an angle 325 describing the camera orientation at the time of image capture. The camera system 160 transmits the captured image data and the associated metadata to the sign association module 150 to be automatically associated with a road segment 305 in the map data for the transport service system 140.

Returning to FIG. 1, the sign association module 150 extracts road sign information from the captured image data and automatically associates road sign information with road segments based on data received from the camera systems 160. For a road sign identified from a set of image data, the sign association module 150 identifies one or more candidate road segments that may be associated with the road sign. Each candidate road segment is scored based on a likelihood that the candidate road segment is associated with the road sign. The score is determined from the distance and orientation of the road sign and the respective candidate road segment, and adjusted based on whether the image data is anomalous. The sign association module 150 identifies the candidate road segment with the highest score as the most likely to be associated with the road sign and associates the road sign with the highest ranked candidate road segment in map data used by the transport service system 140.

By automatically associating road sign information with road segments based on image data and scores generated using distance, orientation, and anomaly detection algorithms, the sign association module 150 corrects incomplete or erroneous map data used by the transport service system 140. Improvements to the map data used by the transport service system 140 ensure that services provided by the transport service system are more accurate and result in improved performance during service. For example, services offered by the transport service system 140 that are reliant on correct map data may include navigation for providing transport services (e.g., during transport services, after dropping off a rider, when picking up a rider), pairing algorithms based at least in part on a distance between a rider and driver, and others. Additionally, the described embodiments reduce the amount of time required by human operators. Instead of relying on operators to manually associate road signs with corresponding road segments, or requiring human supervision to ensure that road signs are accurately associated with road segments, by increasing the accuracy with which road signs are associated with road segments and flagging image data when it is identified as anomalous, efficiency is improved and operator review can be directed to more specific avenues.

Figure 2:
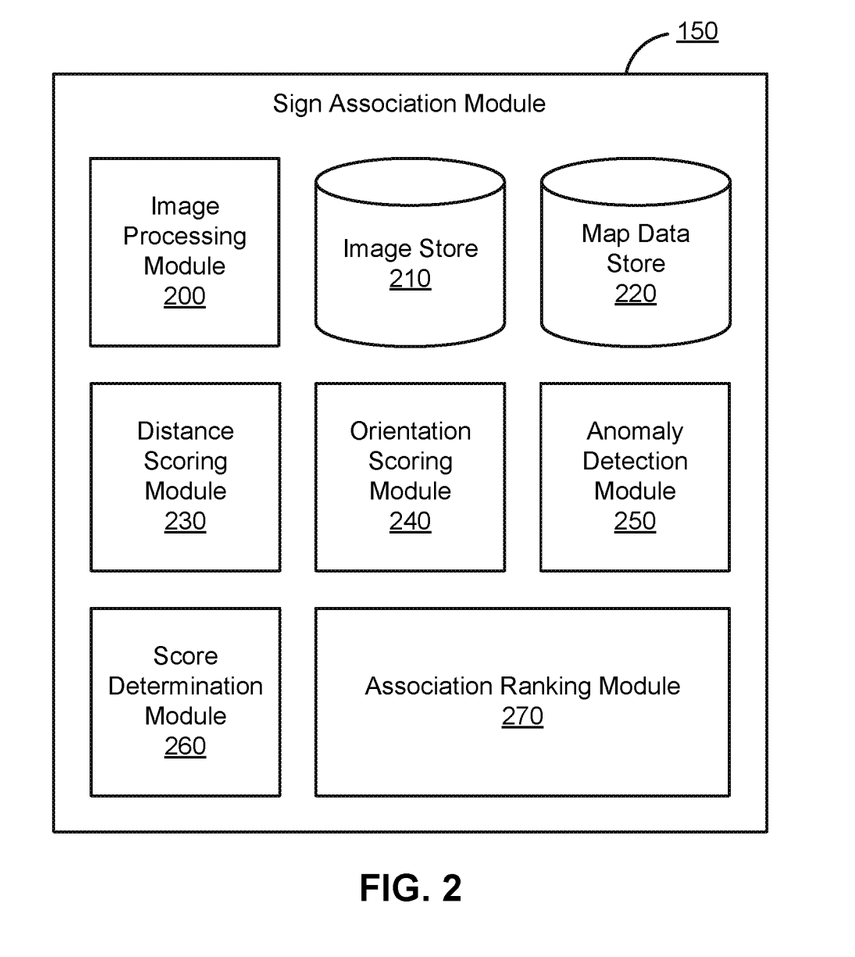
FIG. 2 is a block diagram of an architecture of the sign association module, in accordance with an embodiment.

FIG. 2 is a block diagram of a system architecture for the sign association module 150, in accordance with some embodiments. The sign association module 150 includes various modules and data stores to automatically associate road sign information with road segments. The sign association module 150 comprises an image processing module 200, an image store 210, a map data store 220, a distance scoring module 230, an orientation scoring module 240, an anomaly detection module 250, and an association ranking module 260. Computer components such as web servers, network interfaces, security functions, load balancers, failover servers, management and network operations consoles, and the like are not shown so as to not obscure the details of the system architecture. Additionally, the sign association module 150 may contain more, fewer, or different components than those shown in FIG. 2 and the functionality of the components as described herein may be distributed differently from the description herein.

The image processing module 200 receives image data from the camera systems 160. The received image data contains metadata describing the location at the time of image capture and the camera orientation at the time of image capture. The image processing module 200 performs one or more processes on the received image data to determine road sign information included in the image data. In one embodiment, the image processing module 200 applies a feature extraction process to identify a road sign included in the image data. The feature extraction process applies a bounding box to a road sign in the image data and eliminates unnecessary or irrelevant image data such as buildings, traffic lights, pedestrians, landscape, and the like. The image processing module 200 applies an image recognition process to the extracted road sign in the bounding box. For example, the image processing module 200 compares the extracted road sign to known signs (e.g., stop signs, all speed limit signs, warning signs, and others) to identify a matching sign and the corresponding road sign information. In another embodiment, operators view the image data to identify road sign information corresponding to the image data and provide the identified road sign information to the image processing module 200. The road sign information is associated with the image data.

The image processing module 200 transmits the received image data to the image store 210. In one embodiment, the image processing module 200 identifies one or more image data associated with a road sign and stores image data in association with other image data for the same road sign. For example, the image processing module 200 identifies a plurality of image data associated with a road sign based on the type of road sign, the location at the time of image capture, and other metadata associated with the image data. The plurality of image data is flagged as being representative of the same road sign for use in road sign association analysis in downstream processes.

The image store 210 stores and maintains image data received by the image processing module 200. Image data stored in the image store 210 is associated with metadata including a location at the time of image capture and a camera orientation at the time of image capture. For example, the location at the time of image capture is represented as latitude and longitude coordinates. In an embodiment, the image store 210 additionally associates image data including a representation of a road sign with other image data including representations of the same road sign.

The map data store 220 stores and maintains maps describing geographic regions in which the transport service system 140 generates routes, offers trip coordination services, and the like. The maps contain information about roads within the geographic regions. For the purposes of this disclosure, roads can include any route between two places that allows travel by foot, motor vehicle, bicycle, or another form of travel. Examples of roads include streets, highways, freeways, trails, bridges, tunnels, toll roads, waterways, airways, or crossings. Roads may be restricted to certain users, or may be available for public use. Roads can connect to other roads at intersections. An intersection is a section of one or more roads that allows a user to travel from one road to another. Roads may be divided into road segments, where road segments are portions of roads that are uninterrupted by intersections with other roads. For example, a road segment would extend between two adjacent intersections on a surface street or between two adjacent entrances/exits on a highway.

The map data store 220 also includes map features, which may be stored in association with regions, road segments, and routes. Map features include road features that describe characteristics of a map, such as placement of road signs, speed limits, road directionality (e.g., one-way, two-way), traffic history, traffic conditions, addresses on a road segment, lengths of road segments, and road segment type (e.g., surface street, residential, highway, toll). The map properties can also include features associated with intersections, such as road sign placement, presence of traffic signals, turn restrictions, light timing information, throughput, and connecting road segments. In some embodiments, the map features also include properties describing the geographic region as a whole or portions of the geographic region, such as weather within the geographic region, geopolitical boundaries (e.g., city limits, county borders, state borders, country borders), and topological properties.

The distance scoring module 230 determines a distance score for a candidate road segment and a road sign based on image data from the image store 210 and map data from the map data store 220. The distance scoring module 230 accesses image data from the image store 210 including a representation of a road sign and determines a location of the road sign from metadata (e.g., latitude and longitude information) associated with the image data. The distance scoring module 230 then accesses map data from the map data store 220 to identify one or more candidate road segments. In one embodiment, the distance scoring module 230 identifies candidate road segments based on road segments within a threshold distance of the location of the road sign. The distance scoring module 230 generates a distance score for each candidate road segment using the distance between the location of the road sign and the respective candidate road segment. The distance score is transmitted in association with the candidate road segment to the association ranking module 260.

$$\text{dist}(\tau, r_i) = e^{-0.03 \cdot \max(0, d(\tau, r_i) - 12.9)} \qquad \text{Eq. 1}$$

As in one example shown in Equation 1, the distance score $\text{dist}(\tau, r_i)$ may be computed as a function of the distance $d(\tau, r_i)$ between the road sign $\tau$ and the candidate road segment $r_i$. The distance score is determined such that a shorter orthogonal distance between the road sign $\tau$ and the candidate road segment $r_i$ generates a higher score (e.g., is more likely to be associated with the road sign). In other examples, other constants may be used.

The orientation scoring module 240 determines an orientation score for a candidate road segment and a road sign using image data from the image store 210 and map data from the map store 220. The orientation of the road sign describes the direction that the road sign faces. The orientation scoring module 240 accesses map data from the map data store 220 to identify one or more candidate road segments. In an embodiment, the candidate road segments are determined by identifying road segments within a threshold distance of the road sign. The orientation scoring module 240 determines a direction for each candidate road segment based on the orientation of the candidate road segment. The orientation scoring module 240 generates an orientation score for each candidate road segment using the respective orientations of the road sign and the candidate road segment, such that a candidate road segment is associated with a higher orientation score if the road sign faces oncoming traffic on the candidate road segment. The orientation score is transmitted in association with the candidate road segment to the association ranking module 260.

$$\text{angle}(\tau, S, r_i) = \max(f(\tau, S, n_i), f(\tau, S, -n_i)) \qquad \text{Eq. 2}$$

$$f(\tau, S, n_i) = \qquad \text{Eq. 3}$$
$$\exp\left\{0.62 \cdot \left(1 + \frac{|S|}{\sum_{s_j \in S} \cos(L(sr_j, n_i)) \cdot \mathbb{1}\left[\frac{\pi}{2} < L(sr_j, n_i) \le \pi\right]}\right)\right\}$$

As in one example shown in Equations 2 and 3, the orientation score angle($\tau$, S, $r_i$) may be computed as a function of the viewing angle of a road sign $\tau$ for a candidate road segment $r_i$ based on a set of image data sightings S of the road sign. The orientation score is determined such that images of the set of image data sightings S with a more direct sighting of the road sign count more than indirect sightings, and more direct sightings of the road sign $\tau$ are more likely to come from a road segment associated with it. In an embodiment, the directness of the sighting of the road sign $\tau$ is determined using an angle between the sighting ray $sr_j$ and the segment normal $n_i$ of the candidate road segment $r_i$. As the angle between the vectors of the sighting ray $sr_j$ and the segment normal $n_i$ approach 180°, the directness of the sighting increases and the weight of the sighting increases accordingly.

$$\text{avg\_dir}(\tau, r_i, S) = \frac{1}{|S|}(\Sigma_{s_j \in S} \cos(L(sr_j, n_i)) \cdot \mathbb{1}\left[\frac{\pi}{2} < L(sr_j, n_i) \leq \pi\right]) \quad \text{Eq. 4}$$

In one example shown in Equation 4, the average directness of a sighting for a road sign $\tau$ for a candidate road segment $r_i$ is determined as a function of the set of image data sightings S associated with the road sign.

The anomaly detection module 250 identifies whether image data associated with a road sign is anomalous and determines a score adjustment based on the identification. The anomaly detection module 250 accesses map data in the map data store 220 and image data in the image store 210 including a representation of a road sign and analyzes the map data and the image data to determine if an anomaly exists. Responsive to the image data being identified as anomalous, the anomaly detection module 250 identifies and transmits a score adjustment for the image data to the association ranking module 260.

Figure 4A:
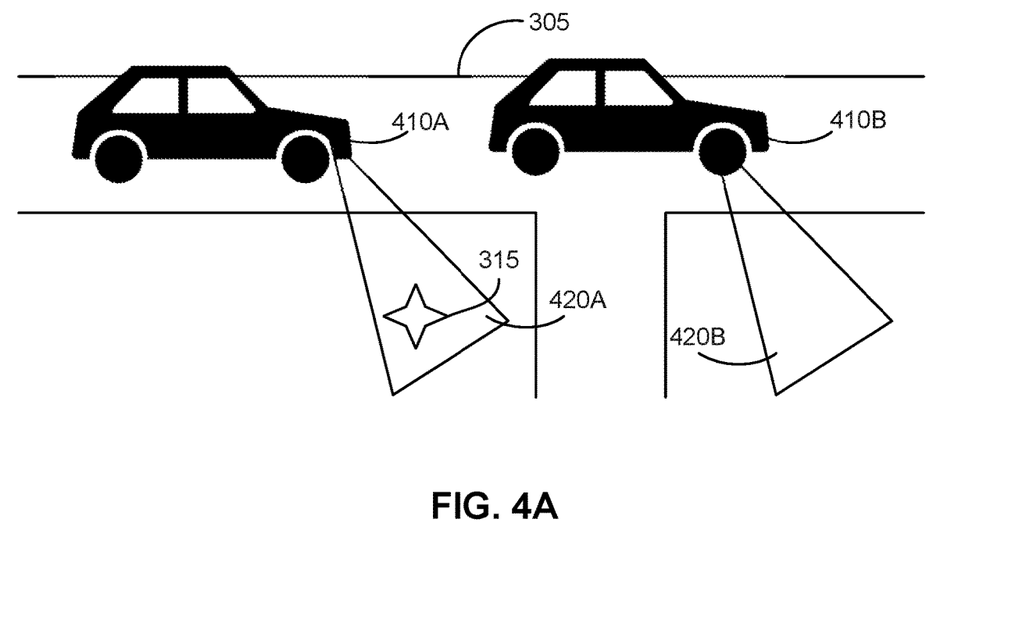
FIGS. 4A-4B are examples illustrating camera systems capturing anomalous image data, in accordance with an embodiment.
Figure 4B:
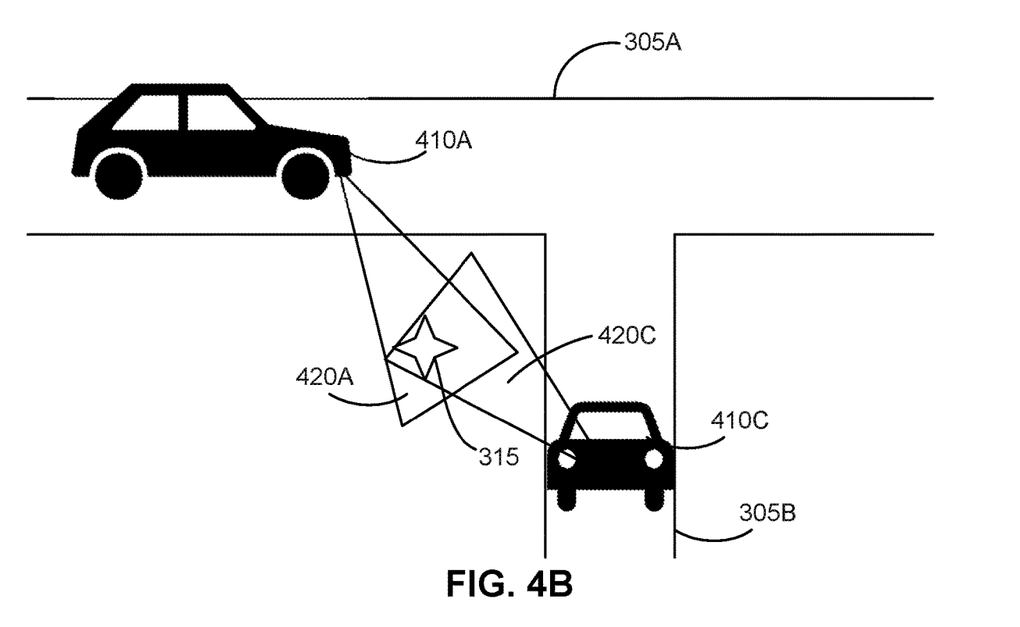

FIGS. 4A-4B are examples illustrating camera systems capturing anomalous image data. In other examples, other anomalies may be identified in the image data. As shown in the example of FIG. 4A, an anomaly occurs for a representation of a road sign included in a plurality of image data when at least one image of the plurality of image data identifies the road sign at a different location. A first vehicle 410A equipped with a camera system 160 traverses a road segment 305. At a first point on the road segment 305, the first vehicle 410A has a viewing triangle 420A including a road sign 315. The first vehicle 410A captures image data including a representation of the road sign 315, the image data associated with metadata including a current location and camera orientation, and transmits the captured image data to the sign association module 150. A second vehicle 410B equipped with a camera system 160 traverses the road segment 305. At a second point on the road segment 305, the second vehicle 410B has a viewing triangle 420B that does not overlap the viewing triangle 420A of the first vehicle 410A. The second vehicle 410B captures image data including a representation of the road sign 315 and transmits the captured image data and associated metadata to the sign association module 150. Based on metadata associated with the respective image data and the respective viewing triangles 420 of the vehicles 410 at the time of image capture, the sign association module 150 determines that the image data for the road sign is anomalous due to the first and second image data representing the road sign at different locations. That is, because the image data for the road sign cannot be viewed by two viewing triangles 420 that do not overlap, the location metadata associated with the image data must be incorrect for at least one of the vehicles 410 and is accordingly flagged as anomalous.

FIG. 4B shows an anomaly occurring wherein a plurality of image data includes a representation of a road sign and at least one image of the plurality of image data identifies an unlikely orientation of a one-sided road sign. A first vehicle 410A equipped with a camera system 160 traverses a first road segment 305A. The first vehicle 410A has a viewing triangle 420A including a road sign 315 facing oncoming traffic for the first road segment 305A. The first vehicle 410A captures image data including a representation of the road sign 315, the image data associated with metadata including a current location and camera orientation, and transmits the captured image data to the sign association module 150. A second vehicle 410C equipped with a camera system 160 traverses a second road segment 305B. The second vehicle 410C has a viewing triangle 420C including a road sign 315. The second vehicle 410C captures image data including a representation of the road sign 315 facing traffic for the second road segment 305B and transmits the captured image data and associated metadata to the sign association module 150. Based on metadata associated with the respective image data and the respective viewing triangles 420 of the vehicles 410 at the time of image capture, the sign association module 150 determines that the image data for the road sign is anomalous due to the first and second image data representing the road sign having different orientations. That is, the sign association module 150 identifies the image data as anomalous because the orientations for the road sign shown in the image data of the two vehicles 410 are unlikely to coexist based on the respective location data of the vehicles. Accordingly, the image data is identified as anomalous.

A plurality of image data may be associated with a road sign 315. The sign association module 150 may identify one image of the plurality of image data as being anomalous and flag the image as being anomalous. In one embodiment, the sign association module 150 removes the anomalous image from use in determining the distance and orientation scores for the road sign association. In another embodiment, the sign association module 150 determines a score adjustment for the road sign based on the anomalous image data.

Returning to FIG. 2, the score determination module 260 receives distance scores, orientation scores, and score adjustments for candidate road segments and determines a composite score and a confidence score for each candidate road segment for a road sign. In one embodiment, the score determination module 260 determines a composite score for each candidate road segment by combining the distance score and orientation score. In an embodiment, the score determination module 260 additionally determines a confidence score for each candidate road segment using the distance score and orientation score and adjusts the confidence score based on the score adjustments. The confidence score reflects a confidence of the score for the candidate road segment.

$$\text{score}(\tau, r_i) = \text{dist}(\tau, r_i) \cdot \text{angle}(\tau, S, r_i) \quad \text{Eq. 5}$$

As one example shown in Equation 5, the composite score score($\tau$, $r_i$) for a candidate road segment $r_i$ may be computed by multiplicatively combining the distance score dist($\tau$, $r_i$) and the orientation score angle($\tau$, S, $r_i$) for the road sign $\tau$ and the candidate road segment $r_i$.

$$\text{conf}(\tau, r^*) = \sqrt{\text{score}(\tau, r^*)} \quad \text{Eq. 6}$$

As one example shown in Equation 6, the score determination module 260 additionally calculates a confidence score conf($\tau$, r*) for a candidate road segment r* and the road sign $\tau$ based on a square root of the composite score score($\tau$, r*). In one embodiment, the score determination module 260 adjusts the confidence score conf($\tau$, r*) based on a score adjustment determined by the anomaly detection module 250. For example, in the case that the anomaly detection module 250 identifies an anomaly, the confidence score is multiplicatively decreased by a constant. In one embodiment, the constant is 0.85. In other embodiments, other constants or functions may be used.

The determined composite scores and confidence scores for the candidate road segments are transmitted by the score determination module 260 to the association ranking module 270.

The association ranking module 270 ranks the candidate road segments based at least in part on the composite scores. In one embodiment, the association ranking module 270 identifies the candidate road segment with the highest composite score as the most likely road segment for the road sign. The association ranking module 270 modifies data in the map data store 220 to associate the road sign information with the road segment. In another embodiment, the association ranking module 270 determines whether the confidence score for the identified road segment is above a threshold score. Responsive to the confidence score being above the threshold score, the association ranking module 270 modifies data in the map data store 220 to associate the road sign information with the road segment. Responsive to the confidence score being below the threshold score, the association ranking module 270 flags the pairing of the candidate road segment and the road sign for review.

(b) Automatically Associating Road Sign Information with Road Segments

Figure 5:
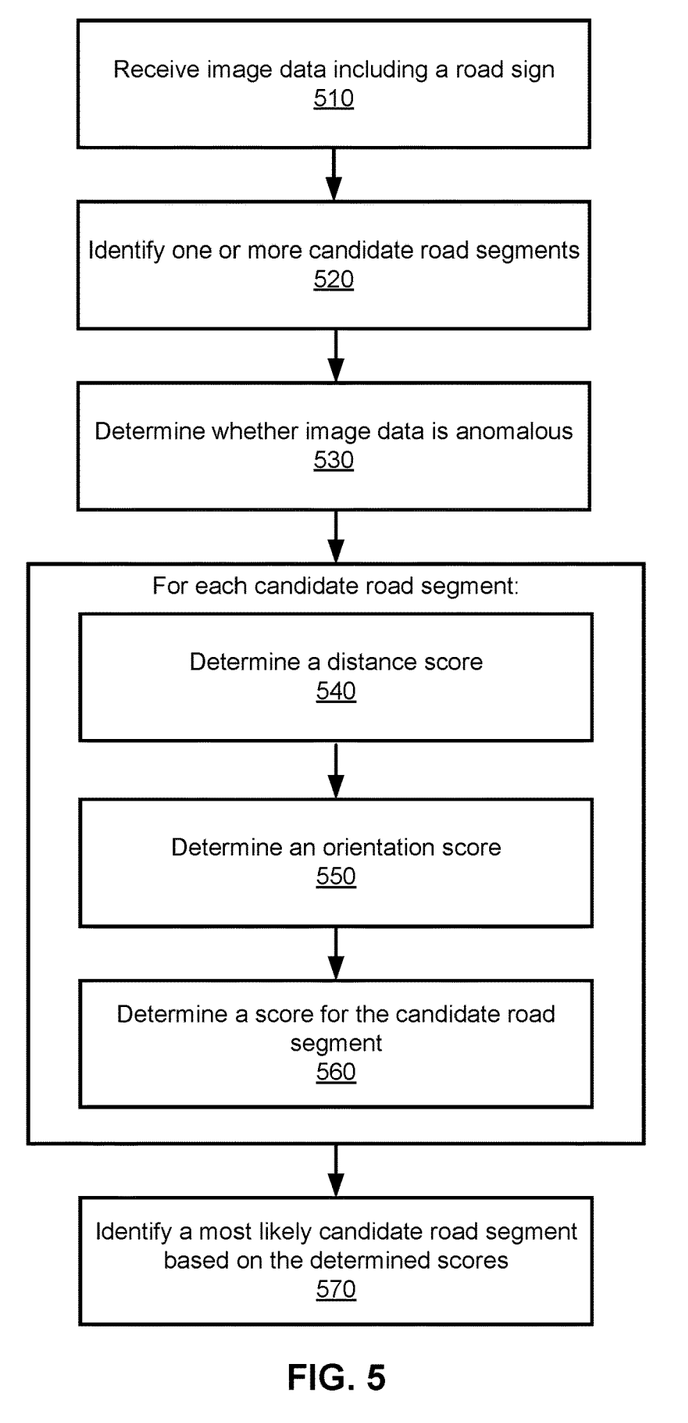
FIG. 5 is a flow diagram of a method for automatically associating road sign information with a road segment, in accordance with an embodiment.

FIG. 5 is a flow diagram of a method for automatically associating road sign information with a road segment based on image data. In various embodiments, the method may include different and/or additional steps than those described in conjunction with FIG. 5.

A transport service system 140 receives 510 image data including a representation of a road sign. The image data is associated metadata including a camera location at the time of capture, a camera direction at the time of capture, and the like. The transport service system 140 identifies 520 one or more candidate road segments for the road sign. Based on one or more images including the road sign and the identified one or more candidate road segments, the transport service system 140 determines 530 whether the image data is anomalous. In one embodiment, the candidate road segments are identified as being within a threshold distance from the location associated with the image data. For each candidate road segment, the transport service system 140 determines 540 a distance score and determines 550 an orientation score. Using the distance score, the orientation score, and whether the image data is anomalous, the transport service 140 determines 560 a composite score and a confidence score for the candidate road segment. The transport service system 140 identifies 570 a most likely candidate road segment based on the determined composite scores. For example, the transport service system 140 ranks the candidate road segments based on the determined composite scores and identifies a highest ranked candidate road segment as the most likely candidate road segment for the road sign.

(c) Example Computer System

Figure 6:
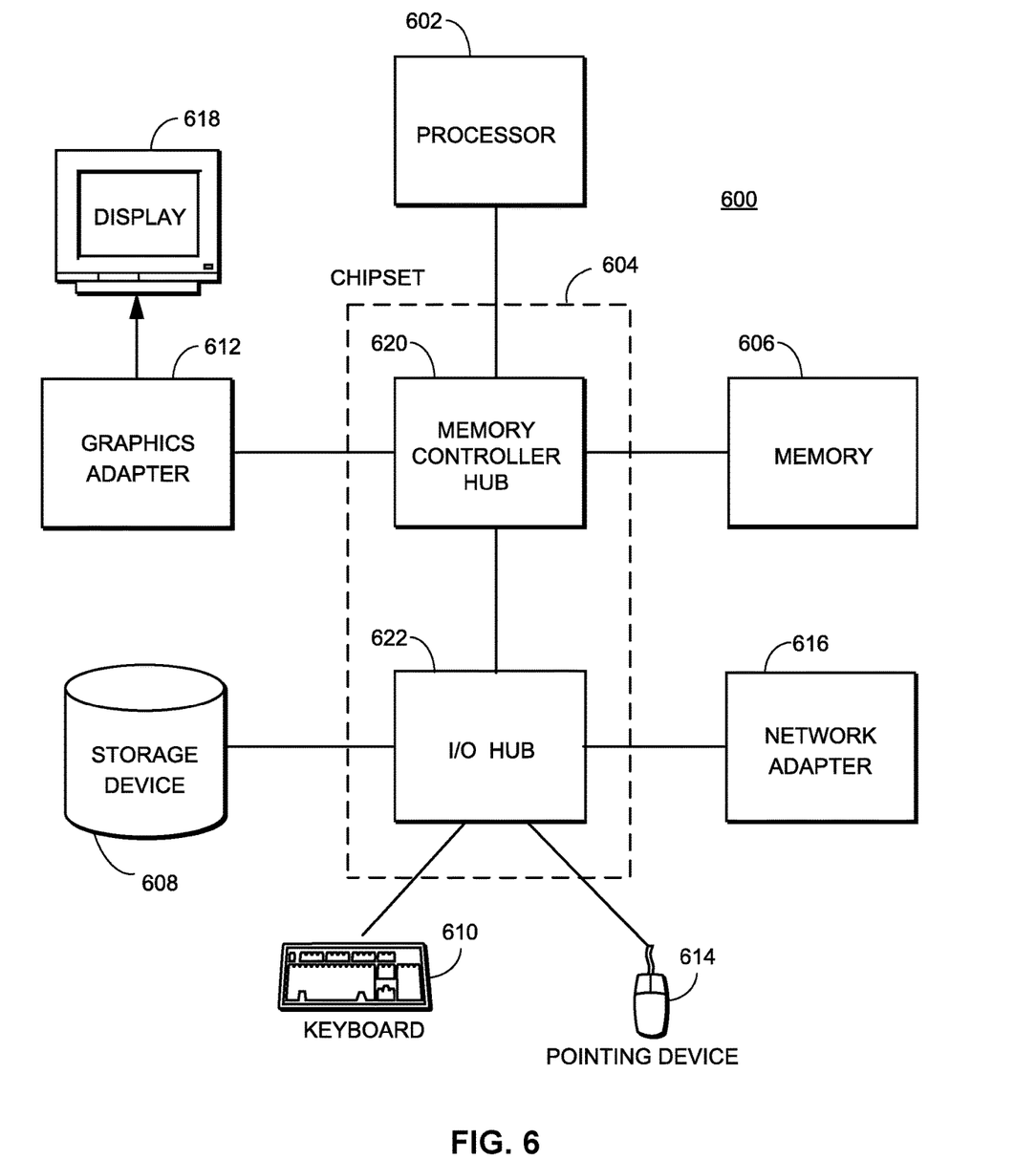
FIG. 6 is a block diagram illustrating physical components of a computer used as part or all of one or more of the entities described herein in one embodiment.

FIG. 6 is a high-level block diagram illustrating physical components of a computer 600 used as part or all of one or more of the computing systems described herein in one embodiment. For example, instances of the illustrated computer 600 may be used as a server operating the transport service system 140. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In one embodiment, one or more sound devices (e.g., a loudspeaker, audio driver, etc.) is coupled to chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

(d) Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for associating road signs with road segments in map data for a transport service system, the method comprising:
   receiving image data including a representation of a road sign, a location, and a camera direction;
   identifying road sign information from the representation of the road sign in the received image data;
   identifying one or more candidate road segments, each candidate road segment potentially associated with the road sign information;
   for each candidate road segment:
      determining a distance score for the road sign and the candidate road segment;
      determining an orientation score for the road sign and the candidate road segment; and
      determining a composite score for the candidate road segment, the composite score based on the distance score and the orientation score for the road sign and the candidate road segment;
   identifying a most likely candidate road segment for the road sign based on the determined composite scores; and
   associating the identified most likely candidate road segment with the identified road sign information in map data for the transport service system.

2. The method of claim 1, wherein identifying a most likely candidate road segment for the road sign based on the determined composite scores further comprises:
   ranking the candidate road segments, the ranking based on the determined composite scores;
   identifying a candidate road segment with the highest determined composite score; and
   selecting the candidate road segment with the highest determined composite score as the most likely candidate road segment.

3. The method of claim 1, further comprising:
   determining for each candidate road segment, based at least in part on the determined composite score associated with the candidate road segment, a confidence score;
   determining that image data associated with the road sign is anomalous; and
   responsive to the determination that the image data is anomalous, adjusting the confidence score for the candidate road segment.

4. The method of claim 3, wherein each image of the received set of image data is associated with a sighting triangle of a camera and determining that image data associated with the road sign is anomalous further comprises:
   identifying that at least one image of the set of image data is associated with a sighting triangle that does not intersect with the sighting triangles associated with the other images in the set of image data; and
   determining that the at least one image of the set of image data is anomalous.

5. The method of claim 3, wherein each image of the received set of image data is associated with a sighting triangle of a camera and determining that image data associated with the road sign is anomalous further comprises:
   identifying that at least one image of the set of image data is associated with a camera direction and sighting triangle indicating an inconsistent sign orientation to a sign orientation indicated in one or more other images of the set of image data; and
   determining that the at least one image of the set of image data is anomalous.

6. The method of claim 3, wherein adjusting the confidence score for the candidate road segment comprises reducing the score for the candidate road segment based on a set confidence factor.

7. The method of claim 1, wherein identifying one or more candidate road segments, the one or more candidate road segments identified as potentially being described by the road sign information, further comprises:
   accessing map data associated with an area based on the location of the image data; and
   identifying one or more candidate road segments within a threshold distance from the location of the image data.

8. The method of claim 1, wherein determining a distance score for the road sign and the candidate road segment further comprises:
   determining an orthogonal distance from the road sign to the candidate road segment; and determining a distance score for the road sign and the candidate road segment as a function of the orthogonal distance from the road sign to the candidate road segment.

9. The method of claim 1, wherein determining an orientation score for the road sign and the candidate road segment further comprises:
   determining an orientation for the road sign, the orientation based on the location associated with the image data and the camera direction associated with the image data; and
   determining a relative angle between the orientation of the road sign and a vector of the candidate road segment; and
   determining an orientation score for the road sign and the candidate road segment as a function of the relative angle between the orientation of the road sign and the vector of the candidate road segment.

10. The method of claim 1, wherein the image data is received from a camera system mounted on a vehicle.

11. The method of claim 1, determining a composite score for the candidate road segment comprises multiplicatively combining the distance score and the orientation score for the road sign and the candidate road segment.

12. A non-transitory computer-readable medium comprising computer program instructions executable by a processor to perform operations for associating road signs with road segments in map data for a transport service system, the operations comprising:
   receiving image data including a representation of a road sign, the image data including information describing a location associated with the image data and a camera direction associated with the image data;
   identifying road sign information from the representation of the road sign in the received image data;
   identifying one or more candidate road segments, the one or more candidate road segments potentially being associated with the road sign information;
   for each candidate road segment:
      determining a distance score for the road sign and the candidate road segment;
      determining an orientation score for the road sign and the candidate road segment; and
      determining a composite score for the candidate road segment, the composite score based on the distance score and the orientation score for the road sign and the candidate road segment;
   identifying a most likely candidate road segment for the road sign based on the determined composite scores; and
   associating the identified most likely candidate road segment with the identified road sign information in map data for the transport service system.

13. The computer-readable storage medium of claim 12, wherein identifying a most likely candidate road segment for the road sign based on the determined composite scores further comprises:
   ranking the candidate road segments, the ranking based on the determined composite scores;
   identifying a candidate road segment with the highest determined composite score; and
   selecting the candidate road segment with the highest determined composite score as the most likely candidate road segment.

14. The computer-readable storage medium of claim 12, further comprising:
   determining for each candidate road segment, based at least in part on the determined composite score associated with the candidate road segment, a confidence score;
   determining that image data associated with the road sign is anomalous; and
   responsive to the determination that the image data is anomalous, adjusting the confidence score for the candidate road segment.

15. The computer-readable storage medium of claim 14, wherein each image of the received set of image data is associated with a sighting triangle of a camera and determining that image data associated with the road sign is anomalous further comprises:
   identifying that at least one image of the set of image data is associated with a sighting triangle that does not intersect with the sighting triangles associated with the other images in the set of image data; and
   determining that the at least one image of the set of image data is anomalous.

16. The computer-readable storage medium of claim 14, wherein each image of the received set of image data is associated with a sighting triangle of a camera and determining that image data associated with the road sign is anomalous further comprises:
   identifying that at least one image of the set of image data is associated with a camera direction and sighting triangle indicating an inconsistent sign orientation to a sign orientation indicated in one or more other images of the set of image data; and
   determining that the at least one image of the set of image data is anomalous.

17. The computer-readable storage medium of claim 14, wherein adjusting the confidence score for the candidate road segment comprises reducing the score for the candidate road segment based on a set confidence factor.

18. The computer-readable storage medium of claim 12, wherein identifying one or more candidate road segments, the one or more candidate road segments identified as potentially being described by the road sign information, further comprises:
   accessing map data associated with an area based on the location of the image data; and
   identifying one or more candidate road segments within a threshold distance from the location of the image data.

19. The computer-readable storage medium of claim 12, wherein determining a distance score for the road sign and the candidate road segment further comprises:
   determining an orthogonal distance from the road sign to the candidate road segment; and
   determining a distance score for the road sign and the candidate road segment as a function of the orthogonal distance from the road sign to the candidate road segment.

20. The computer-readable storage medium of claim 12, wherein determining an orientation score for the road sign and the candidate road segment further comprises:
   determining an orientation for the road sign, the orientation based on the location associated with the image data and the camera direction associated with the image data; and
   determining a relative angle between the orientation of the road sign and a vector of the candidate road segment; and
   determining an orientation score for the road sign and the candidate road segment as a function of the relative angle between the orientation of the road sign and the vector of the candidate road segment.

\* \* \* \* \*